(12) United States Patent
Noguchi

(10) Patent No.: US 12,253,102 B2
(45) Date of Patent: Mar. 18, 2025

(54) CLAMP ASSEMBLY CONFIGURED FOR VERTICAL TIGHTENING

(71) Applicant: Sumitomo Wiring Systems, Ltd., Yokkaichi (JP)

(72) Inventor: Naohiro Noguchi, Marysville, OH (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 651 days.

(21) Appl. No.: 17/653,689

(22) Filed: Mar. 7, 2022

(65) Prior Publication Data

US 2023/0279882 A1    Sep. 7, 2023

(51) Int. Cl.
*F16B 2/02*    (2006.01)
*H01M 50/543*    (2021.01)

(52) U.S. Cl.
CPC ............ *F16B 2/02* (2013.01); *H01M 50/543* (2021.01)

(58) Field of Classification Search
CPC ..... F16B 2/02; H01M 50/543; H01M 50/567; Y02E 60/10
USPC .......................................... 439/754
See application file for complete search history.

(56) References Cited

U.S. PATENT DOCUMENTS

| | | | | |
|---|---|---|---|---|
| 4,435,486 | A * | 3/1984 | Pomaro | B60K 1/04 429/1 |
| 6,087,037 | A * | 7/2000 | Rieder | H05K 3/301 429/100 |
| 6,817,908 | B2 * | 11/2004 | Freitag | H01R 11/283 439/763 |
| 7,234,979 | B2 * | 6/2007 | Fujii | H01R 11/283 439/754 |
| 8,636,550 | B2 * | 1/2014 | Onoda | H01R 13/447 439/762 |
| 9,608,254 | B1 * | 3/2017 | Freitag | H01R 11/283 |
| 9,705,122 | B2 * | 7/2017 | Yamada | H01M 50/567 |
| 9,774,110 | B1 * | 9/2017 | Ritchie | H01M 50/567 |
| 9,979,104 | B2 * | 5/2018 | Falchetti | H01R 13/641 |
| 10,008,789 | B1 * | 6/2018 | Krass | H01R 4/305 |
| 10,224,530 | B2 * | 3/2019 | Tsukiyoshi | H01M 50/566 |
| 10,355,263 | B2 * | 7/2019 | Tsukiyoshi | H01M 50/567 |
| 10,374,339 | B2 * | 8/2019 | Nobukuni | H01M 50/561 |
| 10,424,854 | B2 * | 9/2019 | Muller | H01R 12/7088 |
| 10,707,590 | B2 * | 7/2020 | Crotti | H01R 4/40 |
| 11,264,740 | B2 * | 3/2022 | Ritchie | H01M 50/552 |
| 11,557,816 | B2 * | 1/2023 | Li | H01M 50/172 |
| 2002/0114994 | A1 * | 8/2002 | Yabuki | H01M 50/567 429/185 |

(Continued)

*Primary Examiner* — Alexander Gilman
(74) *Attorney, Agent, or Firm* — Honigman LLP

(57) ABSTRACT

A clamp assembly includes a main body having a through-hole for accommodating a component. The main body includes first end opposite of a second end. A center portion is disposed on the first end. A top portion and a bottom portion are disposed on the second end. The center portion is disposed between the top portion and the bottom portion. The center portion includes an elongated bore. The top portion includes a first bore and the bottom portion includes a second bore. The center portion has a slanted top surface inverse to a bottom surface of the top portion. When the bolt is seated through the elongated bore, the first bore and the second bore and the nut is rotated along the bolt and slides the center portion with respect to the top portion and bottom portion, narrowing or opening the through-hole of the main body.

20 Claims, 3 Drawing Sheets

(56) References Cited

U.S. PATENT DOCUMENTS

| | | | | |
|---|---|---|---|---|
| 2003/0039882 A1* | 2/2003 | Wruck | ............... | H01M 50/562 |
| | | | | 429/178 |
| 2015/0180143 A1* | 6/2015 | Iwata | ................. | H01R 11/285 |
| | | | | 439/754 |
| 2016/0126530 A1* | 5/2016 | Kato | .................. | H01M 50/552 |
| | | | | 429/121 |
| 2017/0077626 A1* | 3/2017 | Yamada | ............... | H01R 11/283 |
| 2018/0076436 A1* | 3/2018 | Sasaki | ................ | H01M 50/567 |
| 2018/0226627 A1* | 8/2018 | Shiohama | ............. | H01R 4/305 |
| 2018/0328996 A1* | 11/2018 | Kimura | ............... | H01R 11/287 |
| 2021/0281089 A1* | 9/2021 | Simonazzi | ........... | H05K 5/0247 |

\* cited by examiner

CLAMP ASSEMBLY CONFIGURED FOR VERTICAL TIGHTENING

TECHNICAL FIELD

The present specification generally relates to clamp assembly and more particularly to clamp assembly having slanted surfaces operable to tighten the clamp assembly.

BACKGROUND

In general a clamp assembly for tightening onto a component includes multiple parts which must be assembled together. In particular, a clamp assembly for tightening onto a component such as a terminal of a battery may include numerous parts. As such, the assembly of a battery to a system requires the installer to keep track of the many parts. In instances where a part is missing, additional time is spent retrieving the missing part.

Further, conventional clamp assemblies are configured with a ring shaped member defining an inner bore configured to tighten onto a terminal. The ring is open at its ends and each end includes a bore extending radially from the inner bore. A bolt is passed through one of the bores and is threaded into the nut to tighten the ring shaped member onto the terminal. As such, clearance space along the radius of the conventional clamp assembly is needed to provide access to the tools to tighten the bolt onto the nut.

Accordingly, it remains desirable to have a clamp assembly which has fewer parts relative to current clamp assemblies and requires little to no clearance space along a radius of the clamp assembly to tighten the clamp.

SUMMARY

In one aspect, a clamp assembly configured to clamp onto a component is provided. The clamp assembly includes a bolt, a nut and a main body. The main body is generally cylindrical and includes a through-hole for accommodating the component. The main body includes first end opposite of a second end. A center portion disposed on the first end. A top portion and a bottom portion are disposed on the second end. The top portion is spaced apart from the bottom portion disposed. The center portion is disposed between the top portion and the bottom portion.

The center portion includes an elongated bore. The top portion includes a first bore and the bottom portion includes a second bore. The center portion has a slanted top surface and a slanted bottom surface. The slanted top surface and the slanted bottom surface are at an angle inverse to the top portion and the bottom portion. When the bolt is seated through the elongated bore, the first bore and the second bore and the nut is rotatably secured to the bolt, the nut is drawn along the bolt so as to slide the center portion with respect to the top portion and bottom portion, narrowing or opening the through-hole of the main body.

In one aspect of the clamp assembly, the clamp assembly includes a washer. The washer is mounted to the bolt and is disposed between the nut and one of the top portion and bottom portion. The clamp assembly may further include the following aspects. The first bore and the second bore have the same dimension. The clamp assembly may further include a neck portion disposed on the first end of the main body portion, the neck portion supporting the center portion. The center portion is the shape of a truncated pyramid. The top portion and the bottom portion are dimensioned to be symmetrical to each other. The top portion includes a top surface and the bottom portion includes a bottom surface, the top surface and the bottom surface are planar and parallel to each other. The slanted top surface is angled between 20 to 70 degrees relative to a plane defined by an upper surface of the main body. A width of the slanted top surface and the slanted bottom surface is greater than a width of the top portion and the bottom portion.

In another aspect of the disclosure a battery assembly is provided. The battery assembly includes a battery and a clamp assembly. The battery includes a terminal. The clamp assembly includes a bolt, a nut, and a main body. The main body is generally cylindrical and includes a through-hole for accommodating the component. The main body includes first end opposite of a second end. A center portion disposed on the first end. A top portion and a bottom portion are disposed on the second end. The top portion is spaced apart from the bottom portion disposed. The center portion is disposed between the top portion and the bottom portion.

The center portion includes an elongated bore. The top portion includes a first bore and the bottom portion includes a second bore. The center portion has a slanted top surface and a slanted bottom surface. The slanted top surface and the slanted bottom surface are at an angle inverse to the top portion and the bottom portion. When the bolt is seated through the elongated bore, the first bore and the second bore and the nut is rotatably secured to the bolt, the nut is drawn along the bolt so as to slide the center portion with respect to the top portion and bottom portion, narrowing or opening the through-hole of the main body.

In one aspect of the battery assembly, the battery assembly includes a washer. The washer is mounted to the bolt and is disposed between the nut and one of the top portion and bottom portion. The clamp assembly may further include the following aspects. The first bore and the second bore have the same dimension. The clamp assembly may further include a neck portion disposed on the first end of the main body portion, the neck portion supporting the center portion. The center portion is the shape of a truncated pyramid. The top portion and the bottom portion are dimensioned to be symmetrical to each other. The top portion includes a top surface and the bottom portion includes a bottom surface, the top surface and the bottom surface are planar and parallel to each other. The slanted top surface is angled between 20 to 70 degrees relative to a plane defined by an upper surface of the main body. A width of the slanted top surface and the slanted bottom surface is greater than a width of the top portion and the bottom portion. The terminal is a cylindrical member.

Advantageous Effects

Accordingly, the clamp assembly is made with relatively few parts, wherein the clamp assembly is configured to tighten onto a component by actuating of a nut and bolt which slides portions of the clamp against each other to tighten onto the component. Further, as the nut sits on top of the clamp assembly access is provided to tighten the clamp assembly and thus clearance space along the radius of the clamp assembly is reduced relative to conventional clamp assemblies.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Figure 1:
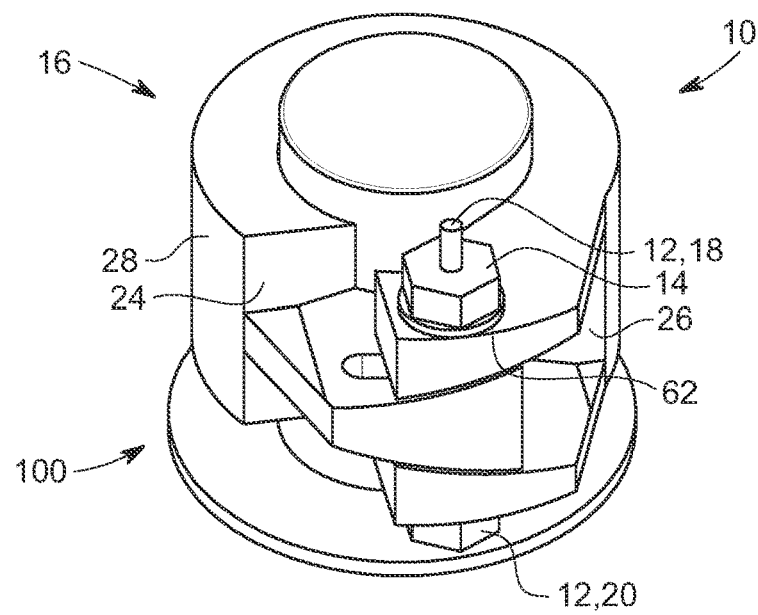
FIG. 1 is an exemplary depiction of a clamp assembly according to one or more embodiments illustrated herein.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or component is referred to as being "on," "engaged to," "connected to," "attached to," or "coupled to" another element or component, it may be directly on, engaged, connected, attached, or coupled to the other element or component, or intervening components or components may be present. In contrast, when an element is referred to as being "directly on," "directly engaged to," "directly connected to," "directly attached to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "top", "bottom", "left" and "right" are directional terms which are made in reference to the upright orientation of accompanying drawings. For example, the term "top" refers to the top of a sheet when the sheet is oriented such that the words are in an upright manner. Likewise, the terms "left" or "right" refer to a lateral direction made when the sheet is likewise oriented.

Referring generally to the figures, embodiments of the present disclosure include a clamp assembly configured to clamp onto a component is provided. The clamp assembly includes a bolt, a nut and a main body. The main body is generally cylindrical and includes a through-hole for accommodating the component. The main body includes first end opposite of a second end. A center portion disposed on the first end. A top portion and a bottom portion are disposed on the second end. The center portion is disposed between the top portion and the bottom portion. The center portion includes an elongated bore. The top portion includes a first bore and the bottom portion includes a second bore. The center portion has a slanted top surface at an angle inverse to a bottom surface of the top portion. When the bolt is seated through the elongated bore, the first bore and the second bore and the nut is rotatably so as to be drawn along the bolt and slide the center portion with respect to the top portion and bottom portion, narrowing or opening the through-hole of the main body.

In one aspect, a clamp assembly 10 is configured to clamp onto a component 100. The clamp assembly 10 includes a bolt 12, a nut 14 and a main body 16. The bolt 12 may include a shaft 18 and a head 20. The shaft 18 is a generally elongated member that is threaded. The head 20 is disposed on one end of the shaft 18, and has a width which is greater than a diameter of the shaft 18. The nut 14 includes a center bore 22, which is threaded. The pitch of the thread is configured to engage with the thread of the shaft 18. As such, the nut 14 is rotatable threaded to the shaft 18, wherein a rotation in a first direction draws the nut 14 closer to the head 20 and a rotation in a second direction, which is opposite of the first direction moves the nut 14 away from the head 20. For illustrative purposes, the first direction is in a clockwise direction and the second direction is in a counter-clockwise direction.

The main body 16 has a cylindrical shape having a first end 24 opposite of a second end 26. The main body 16 includes an outer surface 28 and an inner surface 30 opposite of the outer surface 28. The inner surface 30 defines a through-hole 32 that extends through a center of the main body 16. The through-hole 32 is dimensioned to accommodate the component 100. The through-hole 32 may be contracted or expanded as described in greater detail below.

Figure 5:
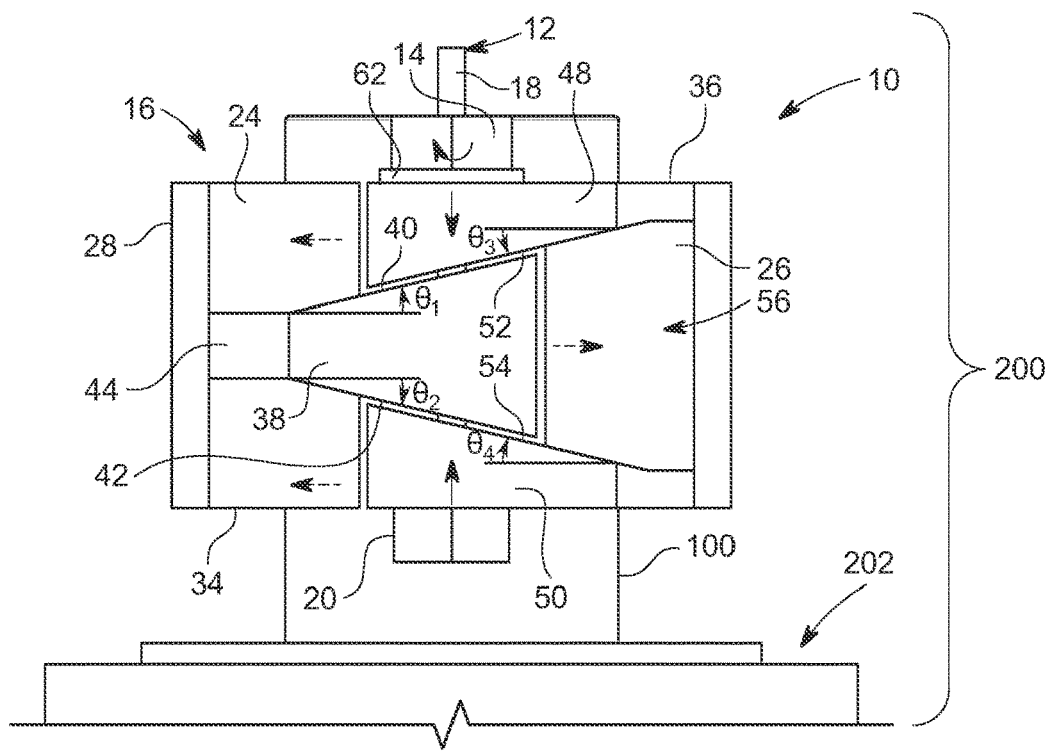
FIG. 5 is front view of FIG. 1 taken along line 5-5.

With reference again to FIGS. 1 and 2 and now to FIG. 5, the main body 16 has a height "H" and a width "W" defining the height and width of the main body 16 which is generally constant along a length of the main body 16, the length being the distance between the first end 24 and the second end 26. The first end 24 and the second end 26 of the main body 16 aregenerally planar surfaces.

The height of the main body 16 is constant along the length of the main body 16 so as to define a planar lower surface 34 and a planar upper surface 36. The width of the main body 16 is likewise constant along the length of the main body 16 as between the first end 24 and the second end 26 so as provide the through-hole 32 with a uniform diameter.

The main body 16 upper surface 36 and lower surface 34 are planar and parallel to each other. The main body 16 is formed of a resilient and durable material such as steel or any metal or metal alloy. Preferably, the main body 16 is formed of an electrically conductive material. The main body 16 is formed as a single, unitary unit.

The main body 16 includes a center portion 38 disposed on the first end 24. Preferably, the center portion 38 is centered with respect to the height of the main body 16. The center portion 38 extends from the first end 24 towards the second end 26 of the main body 16. The center portion 38 is in the shape of a truncated pyramid having a slanted top surface 40 and a slanted bottom surface 42 which are planar and angled away from each other. The end of the center portion 38 is a planar surface which opposes the second end 26 of the main body 16. A neck portion 44 is integrally formed to a proximal end of the center portion 38. The neck portion 44 is interposed between a portion of the first end 24 to the proximal end of the center portion 38. The neck portion 44 is orthogonal to the planar surface of the first end 24. A distal end of the center portion 38 is a generally planar surface. The center portion 38 includes an elongated bore 46. The elongated bore 46 is generally centered within the center portion 38. The elongated bore 46 extends between the slanted top surface 40 and the slanted bottom surface 42 of the center portion 38. Preferably, the elongated bore 46 is arcuate with respect to a plane defining the width "W" of the center portion 38.

The main body 16 further includes a top portion 48 and a bottom portion 50. The top portion 48 and the bottom portion 50 are disposed on the second end 26 of the main body 16. The top portion 48 and the bottom portion 50 extend from the second end 26 towards the first end 24. In one aspect, the top portion 48 is symmetrical to the bottom portion 50.

The top portion 48 includes a second bottom surface 52 and the bottom portion 50 includes a second top surface 54. The top portion 48 is spaced apart from the bottom portion 50 with respect to the height "H" of the main body 16 wherein the second bottom surface 52 faces and opposes the second top surface 54 to define a gap 56. The gap 56 is configured to receive the center portion 38. The second bottom surface 52 of the top portion 48 is at an angle inverse to the angle of the slanted top surface 40 of the center portion 38. The second top surface 54 of the bottom portion 50 is at an angle inverse to the angle of the slanted bottom surface 42 of the center portion 38. Accordingly, the second bottom surface 52 of the top portion 48 is configured to slide against the slanted top surface 40 of the center portion 38. Likewise, the second top surface 54 of the bottom portion 50 is configured to slide against the slanted bottom surface 42 of the center portion 38. As such, the top portion 48 and the bottom portion 50 are configured to move in a direction opposite of the center portion 38 as described in greater detail below. Further, the second bottom surface 52 of the top portion 48 and the second top surface 54 of the bottom portion 50 cooperate with the slanted top surface 40 and the slanted bottom surface 42 of the center portion 38 to retain the center portion 38 within the gap 56.

The top portion 48 includes a first bore 58. The bottom portion 50 including a second bore 60. The first bore 58 extends from the upper surface 36 to the second bottom surface 52 of the top portion 48 so as to extend through the top portion 48. The second bore 60 extends from the lower surface 34 to the second top surface 54 of the bottom portion 50 so as to extend through the bottom portion 50.

Figure 2:
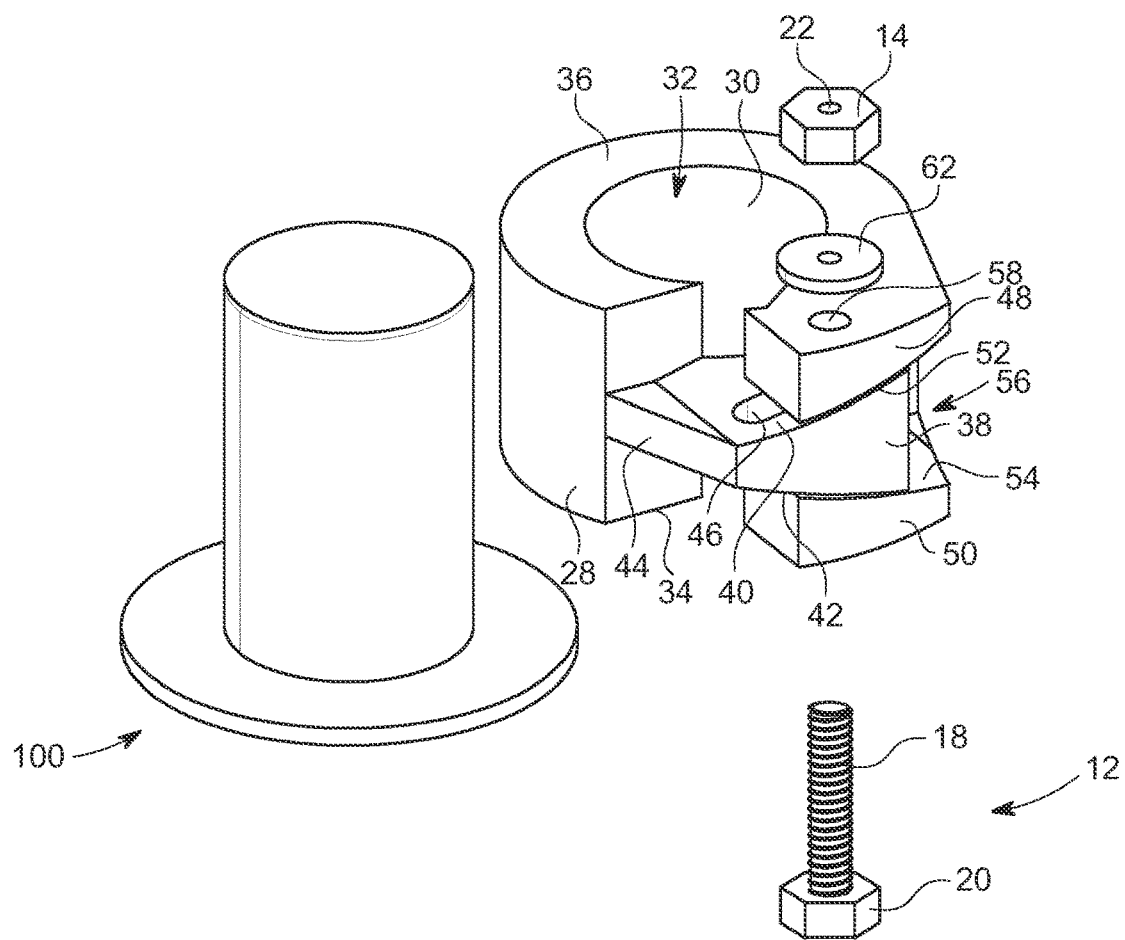
FIG. 2 is an exploded view of the clamp assembly shown in FIG. 1.
Figure 3:
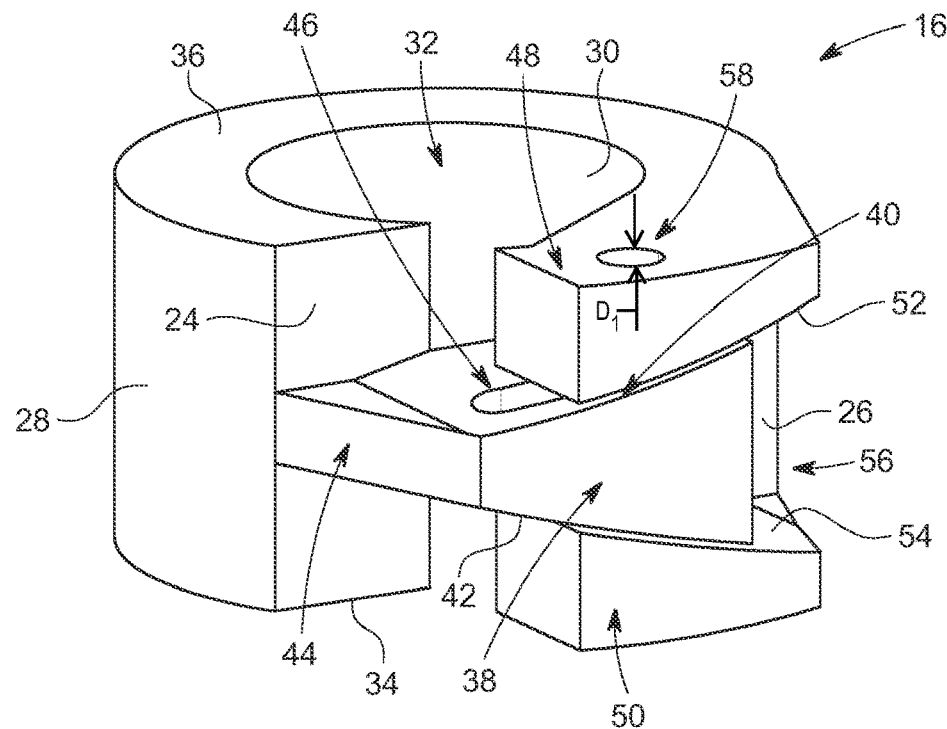
FIG. 3 is a top perspective view of the main body shown in FIG. 1.
Figure 4:
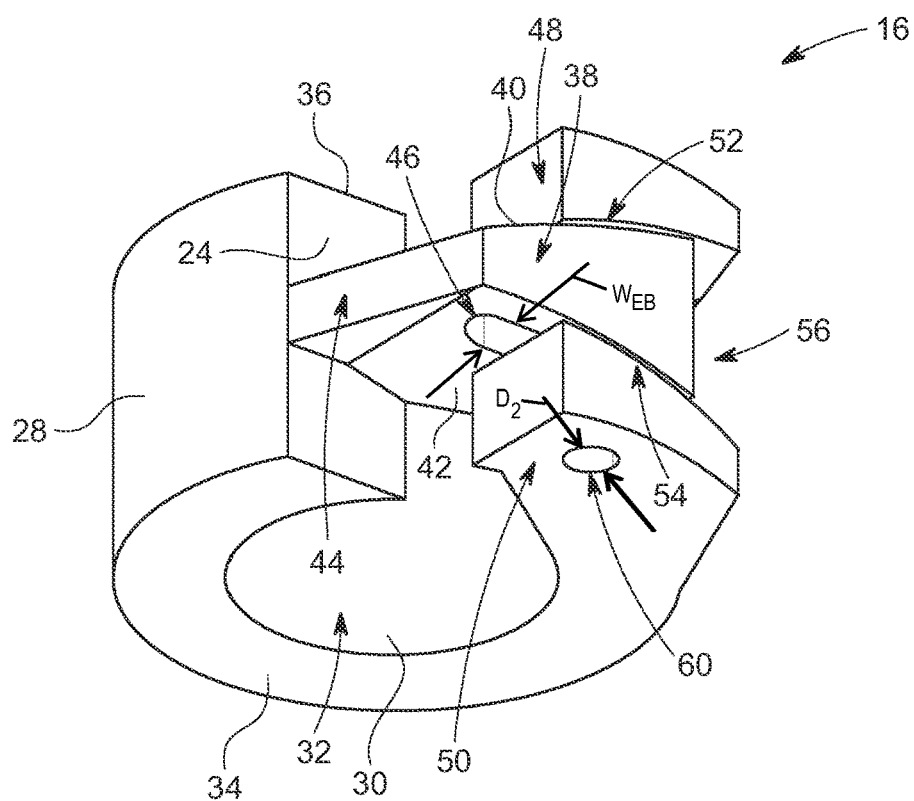
FIG. 4 is bottom perspective view of the main body shown in FIG. 1.

As shown in FIGS. 1 and 2, the shaft 18 of the bolt 12 has a length which is greater than the height "H" of the main body 16. The shaft 18 of the bolt 12 is disposed within the first bore 58, the second bore 60 and the elongated bore 46. The nut 14 is rotatably secured to the shaft 18 of the bolt 12. When rotated in the first direction, the nut 14 is drawn against the top portion 48 so as to slide the center portion 38 with respect to the top portion 48 and bottom portion 50, narrowing or opening the through-hole 32 of the main body 16.

In one aspect, the clamp assembly 10 may further include a washer 62. The washer 62 is mounted to the bolt 12 and is disposed between the nut 14 and one of the top portion 48 and bottom portion 50. Although the FIGS. depict the washer 62 disposed between the nut 14 and the top portion 48, it should be appreciated that the operation of the clamp assembly 10 may be performed by having the washer 62 disposed between the nut 14 and the bottom portion 50 in instances where the shaft 18 of the bolt 12 is inserted through the first bore 58 of the top portion 48.

In one aspect, the first bore 58 and the second bore 60 have the same dimension. In particular, the first bore 58 and the second bore 60 have the same diameter. Preferably, the diameter of the first bore 58 and the second bore 60 are constant along a height of the respective first bore 58 and second bore 60. The diameter of the first bore 58 and the second bore 60 is dimensioned to be greater than a diameter of the shaft 18 of the bolt 12 with minimal tolerance. The elongated bore 46 has a width "W" which is generally the same as the diameter of the first and second bores 58, 60 so as to accommodate the shaft 18 of the bolt 12. The elongated bore 46 has a length "L" which is longer than the diameter of the first and second bores 58, 60. The length of the elongated bore 46 sets the length of travel of the top and bottom portions 48, 50 and the center portion 38 of the main body 16. The width "WEB" of the elongated bore 46 may be the same as the diameter "D1", "D2" of the first bore 58 and the second bore 60.

In one aspect, the upper surface 36 of the main body 16 is continuous and coplanar with the top surface of the top portion 48 and the lower surface 34 of the main body 16 is continuous and coplanar with the bottom surface of the bottom portion 50. The slanted top surface 40 is angled at a first angle $\Theta_1$, the first angle may be between 20 to 70 degrees relative to a plane defined by the top surface of the main body 16. Likewise, the slanted bottom surface 42 is angled at a second angle $\Theta_2$, the second angle may be between 20 to 70 degrees relative to a plane defined by the top surface of the main body 16. Though the Figures show the slanted top surface 40 and the slanted bottom surface 42 angled in the same degree, it should be appreciated that the slanted top surface 40 and the slanted bottom surface 42 may be angled differently. The second bottom surface 52 is angled at a third angle $\Theta_3$ and the second top surface 54 is angled at a fourth angle $\Theta_4$. The first angle $\Theta_1$ and the third angle $\Theta_3$ of the corresponding slanted top surface 40 and the second bottom surface 52 may equal to each other. Likewise, the second angle $\Theta_2$ and the fourth angle $\Theta_4$ of the corresponding slanted bottom surface 42 and the second top surface 54 may equal to each other.

As shown in FIG. 1, the clamp assembly 10 may be used in conjunction with a battery assembly 200. The battery assembly 200 includes a battery 202 having a terminal 100. In such an instance, the terminal 100 is a component. For illustrative purposes, the battery 202 is only partially shown as indicated by the undulating lines. That is, the battery 202 may assume many shapes and the shape of the battery 202 is not limiting to the scope of the appended claims. The terminal 100 is a cylindrical member formed of an electrically conductive material. The terminal 100 is fixed to the battery 202. A conventional wire terminal coupled to a wire (not shown) may be placed onto the terminal 100 and the clamp assembly 10 is configured to tighten onto the terminal 100 securing the wire terminal onto the terminal 100 of the battery 202 so as to complete an electrical connection.

In another aspect, a wire terminal may be coupled to the bolt 12 itself. In such an aspect, the wire terminal may be placed on the lower surface 34 or the upper surface 36 of the corresponding top portion 48 and bottom portion 50 of the main body 16 and secured in place by threading the nut 14 and bolt 12 together. In yet another aspect, a pair of wire terminals may be coupled to the bolt 12. For example, a pair of wire terminals may be laid on top of each other and secured to the bolt 12 and disposed between one of the nut 14 and the upper surface 36 of the top portion 48 of the main body 16; alternatively the pair of wire terminals may be laid on top of each other and inserted onto the bolt 12 so as to be disposed between the head 20 of the bolt 12 and the lower surface 34 of the bottom portion 50 of the main body 12. Alternatively, one of the pair of wire terminals may be placed onto the upper surface 36 of the top portion 48 and the other wire terminal may be placed onto the lower surface 34 of the bottom portion 50. Both of the wire terminals are secured in place by threading the nut 14 and bolt 12 together. Thus, it should be appreciated that the clamp assembly 10 may secure a wire terminal in various manners to achieve an electric connection and the application of the clamp assembly 10 is not limiting to the scope of the appended claims.

Figure 6:
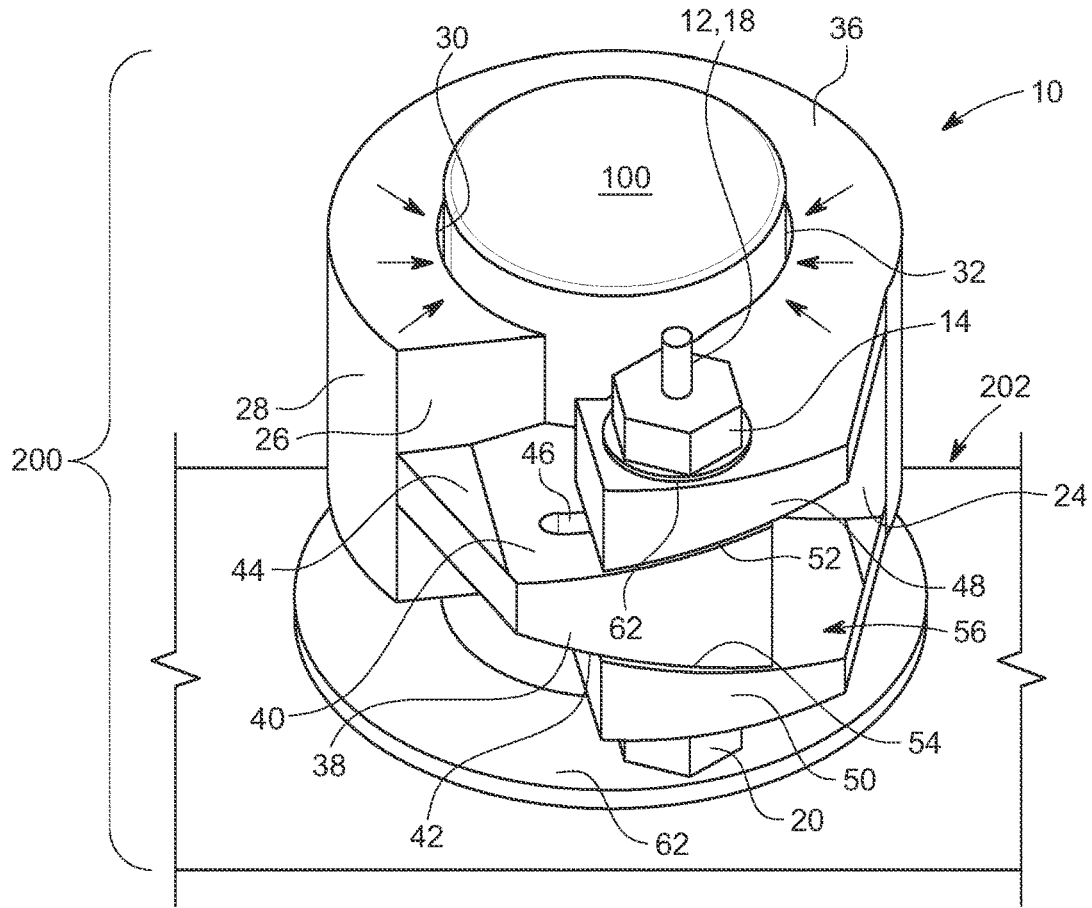
FIG. 6 is a view of FIG. 1 showing the forces and movements associated with the clamp assembly shown in FIG. 1.

With reference now to FIGS. 5 and 6, an operation of the clamp assembly 10 is provided. The operation of the clamp assembly 10 is provided in the context of the battery assembly 200. The bolt 12 is inserted through the first bore 58, the second bore 60 and the elongated bore 46 by pushing the shaft 18 through the second bore 60 first, wherein the head 20 of the bolt 12 is seated against the bottom surface of the bottom portion 50, the bottom surface being the surface opposite of the second top surface 54. The distal end of the shaft 18 protrudes from the top surface of the top portion 48, the top surface being the surface opposite of the second bottom surface 52 of the top portion 48. The partially assembled clamp assembly 10 may then be mounted onto the terminal 100. The wire terminal (not shown) may then be placed onto the protruding portion of the shaft 18 and the washer 62 is then placed over the protruding portion of the shaft 18 and onto the wire terminal. The nut 14 is then threaded onto the shaft 18. It should be appreciated that as the nut 14 is positioned on top of the top portion 48 of the main body 16, the nut 14 may be accessed with little to no clearance space along the radius of the main body 16. As the nut 14 is threaded onto the shaft 18, the main body 16 is tightened vertically, e.g. along its height, and radially.

As discussed above, in another aspect, the wire terminal is placed over the top portion so as to be registered with the first bore 58. The bolt 12 is inserted through the first bore 58, the second bore 60 and the elongated bore 46 by pushing the shaft 18 through the second bore 60 first, wherein the head 20 of the bolt 12 is seated against the lower surface 34 of the bottom portion 50. The distal end of the shaft 18 protrudes from the upper surface 36 of the top portion 48 and through the wire terminal. The partially assembled clamp assembly 10 may then be mounted onto the terminal 100. The washer 62 is then placed over the protruding portion of the shaft 18 and onto the wire terminal. The nut 14 is then threaded onto the shaft 18. A similar process may be completed using two wire terminals.

It should be appreciated that in this condition, illustratively shown in FIG. 5, the through-hole 32 of the main body 16 has a diameter that is greater than the diameter of the terminal 100, allowing the main body 16 to bind the terminal. The center portion 38 may be loosely held between the top portion 48 and the bottom portion 50. However, the center portion 38 is prevented from disengaging by operation of the bolt 12 and nut 14.

The main body 16 is tightened or otherwise clamped onto the terminal by operation of the nut 14. In particular, the nut 14 is rotated in the first direction, e.g a clockwise direction. As the nut 14 is rotated in the first direction, the nut 14 is drawn towards the head 20 of the bolt 12, pressing the washer 62 against the upper surface 36 of the main body 16, and in particular the top portion 48 as shown by the solid arrow, simultaneously, the bottom portion 50 is drawn upwardly as indicated by the solid arrow. As the top portion 48 is brought down by the nut 14, the second bottom surface 52 of the top portion 48 slides against the slanted top surface 40 of the center portion 38 and the second top surface 54 of the bottom portion 50 slides against the slanted bottom surface 42 of the center portion 38 moving the top portion 48 and the bottom portion 50 in a clockwise direction and the center portion 38 in the counter-clockwise direction as indicated by the dashed arrows. Simultaneously, the inner surface 30 of the main body 16 is drawn closer to each other, as indicated by the solid arrows (shown in FIG. 6), narrowing the through-hole 32 and tightening the main body 16 onto the terminal 100. Further the displacement of the top portion 48 and the bottom portion 50 with respect to the center portion 38 is limited by a length of the elongated bore 46. In the event maintenance is required, the clamp assembly 10 may be removed by simply turning the nut 14 in the second direction-counter-clockwise direction until the main body 16 is loosened.

While particular embodiments have been illustrated and described herein, it should be appreciated and understood that various other changes and modifications may be made without departing from the spirit and scope of the claim subject matter. Moreover, although various aspects of the claim subject matter have been described herein, such aspects need not be utilized in combination. It is therefore intended that the appended claims cover all such changes and modifications that are within the scope of the claim subject matter.

I claim:

1. A clamp assembly configured to clamp onto a component, the clamp assembly comprising;
   a bolt;
   a nut; and
   a main body having a cylindrical shape with a through-hole for accommodating the component, the main body including a center portion disposed on a first end, and a top portion and a bottom portion spaced apart from each other, the top portion and the bottom portion disposed on a second end, the center portion being disposed between the top portion and the bottom portion, the center portion including an elongated bore, the top portion including a first bore and the bottom portion including a second bore, the center portion having a slanted top surface and a slanted bottom surface, the slanted top surface and the slanted bottom surface at an angle inverse to the top portion and the bottom portion, wherein the bolt is seated through the elongated bore, the first bore and the second bore, and the nut is rotatably secured to the bolt so as to slide the center portion with respect to the top portion and bottom portion, narrowing or opening the through-hole of the main body.

2. The clamp assembly as set forth in claim 1, further including a washer, the washer mounted to the bolt and disposed between the nut and one of the top portion and bottom portion.

3. The clamp assembly as set forth in claim 1, wherein the first bore and the second bore have the same dimension.

4. The clamp assembly as set forth in claim 1, further including a neck portion disposed on the first end of the main body portion, the neck portion supporting the center portion.

5. The clamp assembly as set forth in claim 1, wherein the center portion is the shape of a truncated pyramid.

6. The clamp assembly as set forth in claim 1, wherein the top portion and the bottom portion are dimensioned to be symmetrical to each other.

7. The clamp assembly as set forth in claim 1, wherein the top portion includes a top surface and the bottom portion includes a bottom surface, the top surface and the bottom surface are planar and parallel to each other.

8. The clamp assembly as set forth in claim 1, wherein the slanted top surface is angled between 20 to 70 degrees relative to a plane defined by an upper surface of the main body.

9. The clamp assembly as set forth in claim 1, wherein a width of the slanted top surface and the slanted bottom surface is greater than a width of the top portion and the bottom portion.

10. A battery assembly comprising:
a battery having a terminal;
a clamp assembly, the clamp assembly including a bolt, a nut, and a main body; and
wherein the main body has a cylindrical shape with a through-hole for accommodating the terminal, the main body including a center portion disposed on a first end, and a top portion and a bottom portion spaced apart from each other, the top portion and the bottom portion disposed on a second end, the center portion being disposed between the top portion and the bottom portion, the center portion including an elongated bore, the top portion including a first bore and the bottom portion including a second bore, the center portion having a slanted top surface and a slanted bottom surface, the slanted top surface and the slanted bottom surface at an angle inverse to the top portion and the bottom portion, wherein the bolt is seated through the elongated bore, the first bore and the second bore, and the nut is rotatably secured to the bolt so as to slide the center portion with respect to the top portion and bottom portion, narrowing or opening the through-hole of the main body.

11. The battery assembly as set forth in claim 10, further including a washer, the washer mounted to the bolt and disposed between the nut and one of the top portion and bottom portion of the main body.

12. The battery assembly as set forth in claim 10, wherein the first bore and the second bore have the same dimension.

13. The battery assembly as set forth in claim 10, wherein the first bore and the second bore have a diameter equal to a width of the elongated bore.

14. The battery assembly as set forth in claim 10, further including a neck portion disposed on the first end of the main body portion, the neck portion supporting the center portion.

15. The battery assembly as set forth in claim 10, wherein the center portion is the shape of a truncated pyramid.

16. The battery assembly as set forth in claim 10, wherein the top portion and the bottom portion are dimensioned to be symmetrical to each other.

17. The battery assembly as set forth in claim 10, wherein the top portion includes a top surface and the bottom portion includes a bottom surface, the top surface and the bottom surface are planar and parallel to each other.

18. The battery assembly as set forth in claim 10, wherein the slanted top surface is angled between 20 to 70 degrees relative to a plane defined by an upper surface of the main body.

19. The battery assembly as set forth in claim 10, wherein a width of the slanted top surface and the slanted bottom surface is greater than a width of the top portion and the bottom portion.

20. The battery assembly as set forth in claim 10, wherein the terminal is a cylindrical member.

* * * * *